(12) United States Patent
Moore et al.

(10) Patent No.: US 8,972,455 B2
(45) Date of Patent: Mar. 3, 2015

(54) SYSTEM AND METHOD FOR TRAFFIC SURGE CONTROL

(75) Inventors: Tiffany A. Moore, Omaha, NE (US);
Anders H Askerup, Omaha, NE (US);
John I Ayers, Omaha, NE (US);
Bradley T Kenyon, Omaha, NE (US);
Michael R Kelly, Omaha, NE (US);
Mark A Montz, Elkhorn, NE (US);
Douglas S Heim, Plattsmouth, NE (US);
Paul L Rozeboom, Omaha, NE (US)

(73) Assignee: Hewlett-Packard Development Company, L.P., Houston, TX (US)

(*) Notice: Subject to any disclaimer, the term of this patent is extended or adjusted under 35 U.S.C. 154(b) by 487 days.

(21) Appl. No.: 12/907,730

(22) Filed: Oct. 19, 2010

(65) Prior Publication Data

US 2012/0096045 A1    Apr. 19, 2012

(51) Int. Cl.
*G06F 17/30* (2006.01)
*G06F 7/00* (2006.01)
*H04L 12/823* (2013.01)
*H04L 12/801* (2013.01)

(52) U.S. Cl.
CPC .............. *H04L 47/32* (2013.01); *H04L 47/14* (2013.01)
USPC ............ 707/802; 709/232; 370/230; 370/235

(58) Field of Classification Search
CPC ........................ H04L 1/188; G06F 17/30539
USPC .................... 707/802; 709/232; 370/230, 235
See application file for complete search history.

(56) References Cited

U.S. PATENT DOCUMENTS

| | | | |
|---|---|---|---|
| 4,486,755 A * | 12/1984 | Hulland et al. | 342/32 |
| 4,626,625 A * | 12/1986 | Daisenberger | 379/137 |
| 5,572,520 A * | 11/1996 | Schenk et al. | 370/232 |
| 5,867,787 A * | 2/1999 | Vudali et al. | 455/445 |
| 5,926,536 A * | 7/1999 | Orlamunder et al. | 379/221.07 |
| 5,991,279 A * | 11/1999 | Haugli et al. | 370/311 |
| 6,215,770 B1 * | 4/2001 | Orlamunder et al. | 370/230 |
| 6,259,776 B1 * | 7/2001 | Hunt | 379/114.01 |
| 6,438,374 B1 * | 8/2002 | Bhat | 455/423 |
| 6,469,991 B1 * | 10/2002 | Chuah | 370/329 |
| 6,522,987 B1 * | 2/2003 | Flink et al. | 702/122 |
| 6,792,099 B1 * | 9/2004 | Na | 379/221.09 |
| 7,266,612 B1 | 9/2007 | Heyman | |
| 7,301,905 B1 | 11/2007 | Tontiruttananon et al. | |
| 7,460,874 B1 * | 12/2008 | Hou et al. | 455/466 |
| 7,751,389 B2 | 7/2010 | Kenyon | |
| 7,991,016 B2 * | 8/2011 | Cankaya et al. | 370/503 |
| 2003/0027571 A1 * | 2/2003 | Karlsson et al. | 455/433 |
| 2003/0210649 A1 | 11/2003 | Bondi | |
| 2006/0187836 A1 | 8/2006 | Frey et al. | |
| 2009/0089793 A1 | 4/2009 | Nandagopal et al. | |
| 2009/0254674 A1 | 10/2009 | Leiden et al. | |

FOREIGN PATENT DOCUMENTS

WO    WO0235860 A1    5/2002

* cited by examiner

*Primary Examiner* — Pavan Mamillapalli

(57) ABSTRACT

System and method for traffic surge control. A control message may be received for registering or managing a device in a network. A measure of a number of current control messages already being processed in the network may be retrieved. A condition may be retrieved, from among a plurality of conditions, that corresponds to the retrieved measure of current control messages, each condition defining different rules for discarding a control message of the same type and corresponding to one of a plurality of measures of current control messages. Based on whether or not the retrieved condition is met, the control message may be processed to register or manage the device or discarded.

20 Claims, 5 Drawing Sheets

SYSTEM AND METHOD FOR TRAFFIC SURGE CONTROL

BACKGROUND

A communication network, such as a telephone or data network, may exchange data wirelessly. To connect to the network, each device may send control messages to register and authenticate the device for permission to send data over the network. A network controller may use the control messages to manage the flow of the data between devices in the network.F In some situations, there may be a surge in control message registration requests, due, for example, to an increase in the number of control messages for registering "smart" phones or other complex devices or due to disruptions or changes in the network itself. Traffic surges may also be triggered by "disruptions" or changes in the network itself. For example, when a connected network entity, such as a visiting location register or a mobile switching center, temporarily disconnects and re-connects, a surge of registration requests may accumulate from network subscribers attempting to access that network entity. Such traffic surges may increase network traffic by, for example, 500% to 700%, and may backlog the network controller, which may be unable to recover and process the control message requests efficiently. This may result in a failure to access the communications network.

BRIEF DESCRIPTION OF THE DRAWINGS

Specific embodiments of the present invention will be described with reference to the following drawings, wherein.

Figure 1:
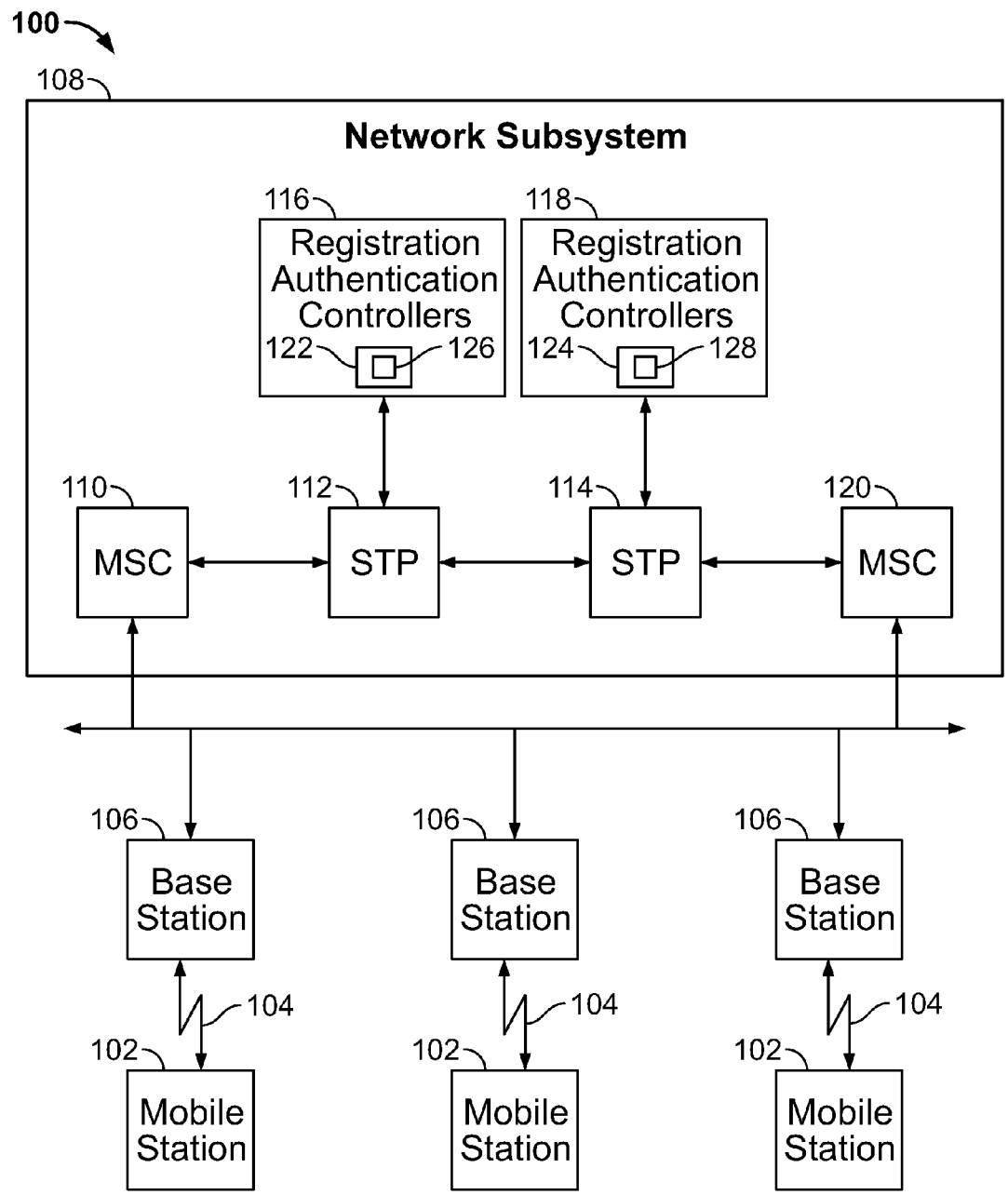
FIG. 1 is a schematic illustration of a network according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various embodiments of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "process-ing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

To initiate communicate in a computing network, devices may use control messages to register with a registration authentication controller, which may verify registration and authentication information of a device subscriber. When the device is in the subscriber's home region, the registration authentication controller may find the subscriber information in a subscriber database, e.g., a home location register (HLR) or Authentication Center (AuC). However, when the device is roaming (e.g., outside the subscriber's home region), the registration authentication controller may generate a temporary user profile in a temporary database, e.g., a visiting location register (VLR).

As the number of new calls increases, the number of subscriber look-up requests may also increase. A surge in subscriber look-up requests may overload the registration authentication controller. One way to reduce surges in network traffic is to blindly discard registration messages, which may prevent access to the network. In some systems where registering includes processing a sequence of multiple messages, communication may be blocked if there is high network traffic for even one message in the registration sequence.

Instead of disrupting the network registration process, embodiments of the present invention may process initiated registration attempts to completion for which the registration process is already initiated and may discard control messages only for new devices that haven't yet initiated the registration process. Furthermore, instead of disrupting the network registration process indiscriminately, without testing a basis or criterion for disrupting registration attempts, some embodiments may reject new registration attempts based on a measure of a network entity (e.g., a home location register HLR) overload. In one embodiment, the network entity may store an overload look-up table defining a plurality of levels or measures of the network entity overload and corresponding rules or criteria for blocking new registration requests at each overload level. Each overload level may correspond to a condition, test or rule for processing or discarding a new registration request at that level.

In one embodiment, each overload level may correspond to a different discard percentage, rate or frequency for discarding new registration requests at that level. The condition for discarding new requests at each discard percentage may be tested by generating a random percentage and, if the percentage is less than the condition's discard percentage, the condition is met and the request is discarded. A randomization factor may be used to coordinate multiple network processes handling message traffic, where each process may receive a different amount of messages from the network and so that the network does not have to track the number of messages received by type, which may not be part of the architecture of the processing environment.

Thus, for each new registration attempt, the registration authentication controller may retrieve an indication of the current network entity overload, select the closest matching overload level in the overload table, retrieve the corresponding message discard percentage and test whether a random generated percentage exceeds the discard percentage. Generally, a higher level of overload corresponds to a larger discard percentage. Since the larger the discard percentage, the greater the probability that a randomly generated percentage will be smaller on average than that discard percentage, then in general the higher the overload, the more registration requests will be blocked. Accordingly, network traffic flow is defined by the discard percentages to maintain an optimal processing rate.

When the registration process includes a sequence of registration messages of a plurality of different types, some embodiments may monitor the traffic levels of each different control message type. The traffic levels of each type may be monitored, e.g., simultaneously, in parallel or sequentially in the order in which the messages are processed in the registration sequence. Each message type may have a different set of conditions for the plurality of different traffic levels for that message type.

Discard functionality may be automatically implemented, for example, when a traffic surge is detected or a surge warning is issued, and may be automatically disabled at normal network levels.

Reference is made to FIG. 1, which schematically illustrates a mobile network 100 according to embodiments of the invention.

Network 100 may be a communications network for transmitting data between network devices, such as mobile stations 102, via network 100. Network devices may send control messages to network 100 for registering, authenticating and requesting permission to send data over network 100. Network 100 may be any telephone or data network such as, for example, a Global System for Mobile Communications (GSM) network or a Universal Mobile Telecommunications System (UMTS). Network 100 may include digital cellular telephone technology utilizing time division multiple access (TDMA) or code division multiple access (CDMA) modulation to communicate signals over network 100. Network 100 may use a communication signal protocol, for example, Signaling System Number 7 (SS7) protocol. Network 100 may include a Home Subscriber Server (HSS) that supports access to Evolved Packet System (EPS), Internet Protocol (IP) Multimedia Subsystem (IMS), and wireless local area network (WLAN) domains, e.g., as defined by the 3rd Generation Partnership Project (3GPP) protocol.

Network 100 may include one or more mobile stations 102 such as cellular telephones or other mobile devices, each of which may communicate over a wireless communications channel 104 with a base station 106. Base stations 106 may communicate with mobile stations 102 in the geographical region or "cell" covered by network 100. Base stations 106 may also communicate with a network subsystem 108 to route calls to and from mobile stations 102 and verify control messages for registering and authenticating mobile stations 102 using associated subscriber information stored in network subsystem 108.

Network subsystem 108 may manage network traffic directing control messages to their destination and may selectively discard control messages, e.g., based on logical rules or conditions. Network subsystem 108 may include mobile switching centers (MSCs) 110, 120, signal transfer points (STPs) 112, 114, and registration authentication controllers 116, 118.

Mobile switching centers 110, 120 may communicate with base stations 106 and route messages to and from other components in network subsystem 108 to verify subscriber registration and authentication information. Mobile switching centers (MSC) 110, 120 may perform other functions such as updating the location of mobile stations 102. Mobile switching centers 110, 120 may communicate with base stations 106 via control messages defined according to a specific network subsystem 108 communication protocol.

Signal transfer points 112, 114 may route the control messages to appropriate points in network 100 based upon routing information contained in each control message. For example, routing information may include a device address or pointer, such as a destination point code (DPC) and signaling connection control part (SCCP) address information, defining the destination point or device(s) in network 100 to which the control messages are routed. In this way, each signal transfer point 112, 114 may function as a network hub and may eliminate the need for direct links between devices in network 100.

Registration authentication controllers 116, 118 may include a database that stores subscriber information such as registration, feature, and authentication data associated with each subscriber. Registration authentication controllers 116, 118 may include, e.g., home location registers (HLRs), home subscriber servers (HSSs), Subscriber Locator Functions (SLF), STPs, MSCs, Serving GPRS (General Packet Radio Service) Support Node (SGSN), Authentication Centers (AuCs), or other devices for managing registration and subscription information for network 100 devices. Registration authentication controllers 116, 118 may operate in combination with mobile switching center(s) 110, 120 using subscriber information to grant or deny mobile stations 102 or network subscribers access to register in network 100.

In operation, when a subscriber initiates a call from mobile station 102, one or more corresponding control message(s) may be communicated over wireless communications channel 104, through base station 106 to mobile switching center 110 or 120. In response to the message(s), mobile switching center 110, 120 may communicate, e.g., via signal transfer point 112, 114, with the appropriate registration authentication controller 116, 118 to verify registration and authentication information for the subscriber.

When mobile station 102 is in the "cell" or home area covered by network 100, HLR registration authentication controller(s) 116, 118 may verify subscriber information. However, when mobile station 102 is outside the cell or home area of the subscriber, VLR registration authentication controller 116, 118 may verify subscriber information. HLR may store user (subscriber) information, e.g., customer profiles, account information, account status, security specifications, user preferences, features subscribed to by the user, the user's current location, etc., used in network 100. VLR may temporarily store profiles of roaming users (users outside their home area). In one embodiment, registration authentication controller(s) 116, 118 may manage registration information from HLR and/or VLR, and mobile switching center(s) 110, 120 may verify mobile station(s) 102 using the registration information.

Once the registration information from a first mobile station 102 has been verified, mobile switching center(s) 110, 120 may process a control message to connect or place the call to a second verified mobile station 102.

During network 100 operation, registration authentication controller 116, 118 may detect a surge in control messages. A significant traffic surge, for example, exceeding 500% to 700% of the standard message processing capacity, may degrade network 100 communications and disable the capabilities of mobile switching centers 110, 120 and registration authentication controllers 116, 118. Once a traffic surge occurs, registration authentication controller(s) 116, 118 may become backlogged and unable to process the influx of message requests.

One or more traffic surge controllers 122, 124 may monitor network traffic levels and control surges in network traffic. Traffic surge controllers 122, 124 may provide centralized and automated network traffic surge control through configurable/programmable settings (e.g., percentages or rates for discarding new registration messages). Using an overload table, traffic surge controllers 122, 124 may determine the size of the traffic surge and may take corrective measures to control traffic overload by selectively discarding messages at a corresponding rate. For example, as the level of registration traffic fluctuates over time, traffic surge controllers 122, 124 may discard new registration messages at a proportionally fluctuating rate. Traffic surge controllers 122, 124 may automatically activate and deactivate traffic surge control functionality, for example, when network subsystem 108 detects a predetermined increase and decrease in network 100 traffic, respectively.

Traffic surge controllers 122, 124 may request a measure of network 100 traffic or overload for a network entity or node, such as registration authentication controllers 116, 118. The overload level may be measured and/or stored at one or more counters 126, 128 using a network application programming interface (API). Traffic surge controllers 122, 124 may send a request for overload measurements, for example, periodically (triggered by a clock or beacon signal), or each time a new control message is received for registering a new mobile station 102 in network 100.

Counters 126, 128 may measure values, rates, frequencies, or volumes of control messages for registering new devices and/or overall network 100 traffic flow. In one embodiment, counters 126, 128 may provide a measure of a total number of current control messages being processed, or queued to be processed, e.g., for registering mobile stations 102 in network 100. In another embodiment, when registering includes processing a plurality of different types of messages, counters 126, 128 may measure each type of control message separately. In one embodiment, each of n different types of control messages in the sequence may be processed separately, for example, in parallel, by n different network 100 processors or controllers. Network subsystem 108, e.g., using a service control point (SCP) environment, may funnel control messages of each type to their designated processor. The plurality of messages may all have the same priority. In one example, where Mobile Application Part (MAP) messages are used, all messages may be high priority. In some embodiments, a different counter may be used to measure each different one of the plurality of types of control messages that are processed separately. In yet another embodiment, instead of counting a total number of control messages, counters 126, 128 may measure only the control message overload, e.g., measuring a number, range or percentage, of the current control messages that exceed a predetermined traffic surge threshold. The control message overload may be measured, e.g., for all types of control messages together or separately for each different type of control message. In some embodiments, instead of listing exact measurements, counters 126, 128 may record a traffic flow rank, level, order or score listing relative values or scaled values of the exact measurements. Counters 126, 128 may measure other numbers, ranges or percentages of control messages and/or traffic flow. Counters 126, 128 may store a running tally of measurements at one or more pre-designated memory addresses. For example, when monitoring multiple control message types, a separate address may be used to store measurements for each different type of control message for independent retrieval. Alternatively, all instantaneous measurements may be retrieved together from the same memory address, e.g., as a single cumulative value or a string of separate values.

A memory may store a plurality of predetermined overload measures or levels and a plurality of predetermined discard conditions. Correspondences may be stored between the plurality of network overload levels and the plurality of discard conditions, e.g., for each new mobile station 102 attempting to register or for each different type of control message in a sequence of registration control messages. Correspondences between different overload levels and different discard conditions may be injective (each overload level corresponds to a different discard conditions), surjective (each discard condition corresponds to at least one overload level, but the same condition level may be used for multiple overload levels) or bijective (each discard condition uniquely corresponds to a different overload level). The overload levels, conditions, and/or correspondences may be stored, for example, as a continuous function or as discrete values in a tree, matrix, table, or relational database, such as relational overload database 300 shown in FIG. 3.

Once the actual measured network entity overload is retrieved, traffic surge controllers 122, 124 may select the specific one of the plurality of predetermined overload levels that is closest to the measured overload. Traffic surge controllers 122, 124 may then automatically retrieve the discard condition corresponding to the selected predetermined overload level.

Discard conditions may define requirements or rules for discarding or, conversely, for processing (not discarding) a new control message for registering a new mobile station 102 in network 100. Since registering typically requires processing a plurality of different types of control messages, traffic surge controllers 122, 124 may independently monitor the overload level for each different message type and independently test conditions therefor. In some embodiments, since network 100 typically does not drop mobile stations 102, traffic surge controllers 122, 124 may initiate registering the device only if all conditions test positive for all message types in the registration process. This "lowest common denominator" approach detects if even one (or a predetermined number) of the control messages in the registration sequence will be blocked to prevent partial registration, e.g., wasting resources to execute some but not all control messages in the registration sequence.

In one embodiment, when the plurality of control messages are executed in sequential order, traffic surge controllers 122, 124 may continuously monitor a first message type in the sequence and may only begin to monitor and test a second message type in the sequence when the condition for the first message type is successfully met. This chain of dependence may continue so that the third message type is monitored or tested only if the first and second successfully complete, and so on. Since each subsequent message in the sequence may be executed only if the previous message is executed, verifying each message serially, in order, may reduce unnecessary monitoring and testing of messages that may never be used. In another embodiment, each different type of message may be independently monitored, e.g., in parallel. Traffic surge controllers 122, 124 and/or network subsystem 108 may control, test and selectively discard messages.

Once the discard condition(s) is/are selected, traffic surge controllers 122, 124 may determine whether or not the condition(s) is/are met. In one embodiment, discard conditions may define percentages, ratios, rates or frequencies of discarding control messages for registering new devices. In general, higher traffic overload levels correspond to higher discard values. To test the discard conditions when the conditions define discard percentages (n %), 0≤n≤100, traffic surge controllers 122, 124 may discard n out of every hundred new control messages. Traffic surge controllers 122, 124 may discard the first, last, or middle n consecutive or non-consecutive messages, every other message up to n messages or a random or predetermined pattern of n messages out of every hundred. In another example, a condition may define a discard ratio, e.g., 1/n, n>0, and traffic surge controllers 122, 124 may discard one (1) out of every n new control messages. Similarly, the discarded control message may be the first, last, middle or randomly selected out of a sequence of n messages.

In some embodiments, for each discard value, traffic surge controllers 122, 124 may use a random generator to generate a random value. To test a discard percentage (n %), traffic surge controllers 122, 124 may generate a random number, r (modulo 100), which is equivalent to a random percentage, r %, 1≤r %≤100. If the random percentage is less than or equal to the discard percentage, r %≤n %, then the discard condition is met and the message triggering the overload retrieval is discarded and device registration is blocked or stalled. Otherwise, if the random percentage is greater than the discard percentage, then the discard condition is not met and the message triggering the overload retrieval is processed and the corresponding new device may be registered. Since a random percentage, r %, 1≤r %≤100, is generally not less than or equal to 0%, a discard percentage of 0% may cause traffic surge controllers 122, 124 to processed (not discard) all messages requesting to register with a network entity. A 0% discard percentage may be used, for example, when the network entity has no overload. Similarly, since a random percentage, r %, 1≤r %≤100, is generally less than or equal to 100%, a discard percentage of 100% may cause traffic surge controllers 122, 124 to discard all messages requesting to register with a network entity. A 100% discard percentage may be used, for example, when the network entity disconnects from the network, has blocked communication or has a maximum overload level.

In general, the larger the discard percentage n %, the more likely a randomly generated percentage r % will be less than or equal to the discard percentage n %, (discarded) and the less likely the randomly generated percentage r % will be greater than the discard percentage n %, (not discarded). Since network 100 may process up to a predetermined number of registration messages at optimal efficiency, to maintain optimal network 100 efficiency, as the level of network entity overload increases, the discard percentage may also increase. In one example, the discard percentage may be proportional to the overload percentage or level.

In one embodiment, the proportionality between the discard percentage and the overload level or percentage $$\left(e.g., \frac{\text{overload messages}}{\text{total messages}} 100\%\right)$$

may be constant. That is, the percentages of total messages that overload the system and the percentages of messages that are discarded may increase together, e.g., at the same rate. In another embodiment, the discard percentage and the overload level or percentage may both increase together, but at a different rate, i.e., with a non-constant proportionality. In one embodiment, the percentage of discarded messages may increase at a greater (or smaller) rate than the percentage of overload messages. For example, the proportionality between the discard percentage and the overload level or percentage may be exponential, e.g., $e^x$ and $e^{-x}$, respectively. This exponential proportionality may cause the overload message percentage to asymptotically approach a predetermined value (defined by the exponential rate) to maintain a stable maximal traffic flow.

In one embodiment, the discard percentages may be adjusted for each overload level to customize control message traffic flow. For example, a discard percentage of 100% may be associated with the desired maximum network control traffic level (e.g., so that 0% of messages are processed). At a minimum level (or no) overload, the discard percentage may be set to 0% so that all messages are processed. Discard percentage for all other levels of overload (between 0% and 100%) may be individually set or defined by a proportionality function.

In some embodiments, a user-adjustable scaling factor, a, may be used so that messages may be discarded if a (random %)≤overload %. The greater the value of a, the fewer random percentages are less than or equal to the overload percentage and thus, the more messages that may be discarded.

Figure 2:
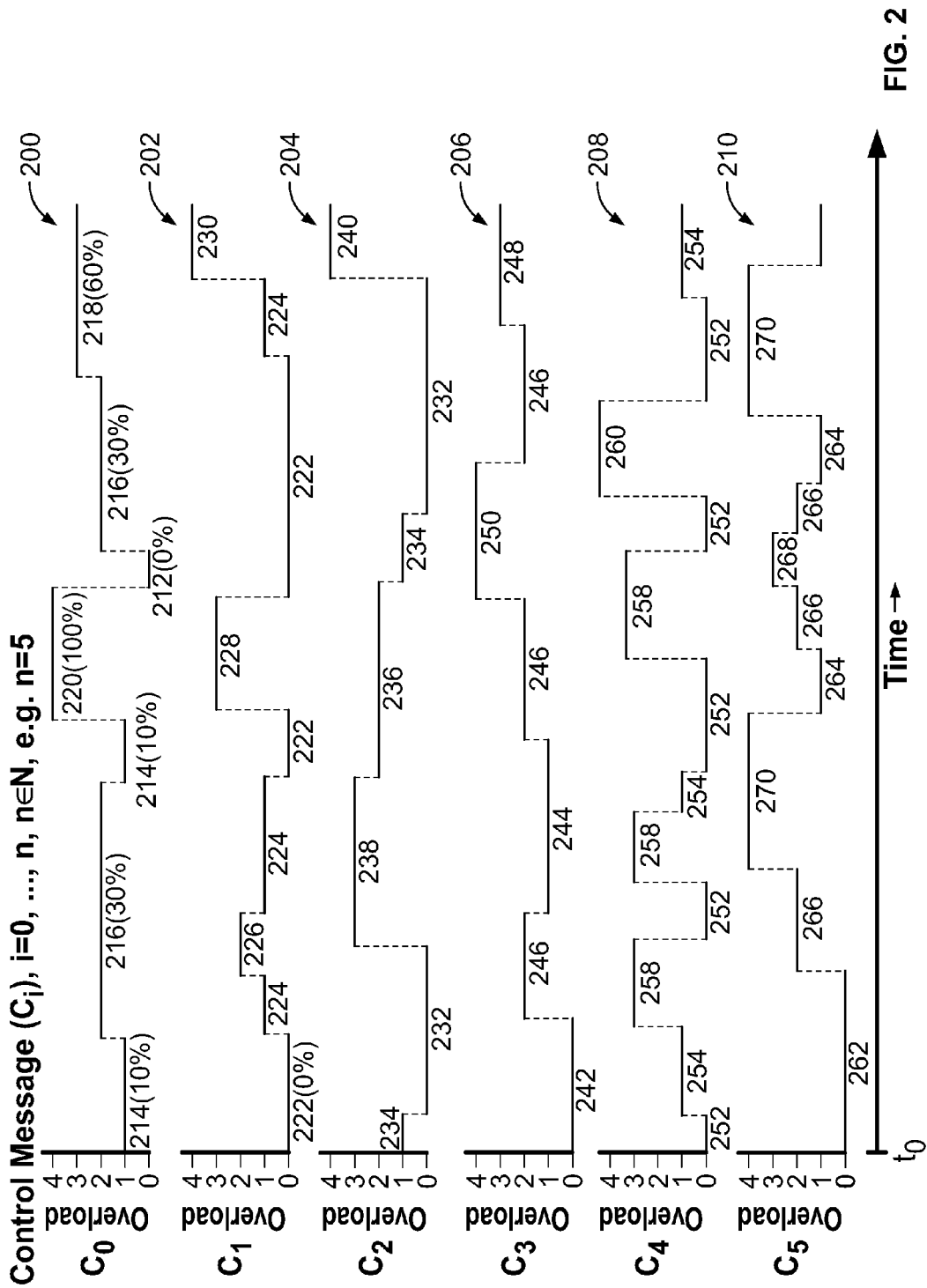
FIG. 2 is a schematic illustration of overload levels monitored according to embodiments of the invention.

Reference is made to FIG. 2, which schematically illustrates overload levels monitored according to an embodiment of the invention.

A plurality of control messages, $C_i$, i=0, 1, . . . , 5, of a plurality of different respective types, when executed together, e.g., in sequence, may register a device in a network (e.g., network 100 of FIG. 1). Each type of control message in the sequence may be responsible for executing a separate step or function of the registration process. All types of control messages in the sequence may have the same priority, e.g., since together they achieve the same result of registering a device. Typically control messages of each of the plurality of different types (or at least two of the types) are executed separately, e.g., at different times or processors. Therefor each of the plurality of different control message types may have a different independent associated level of overload.

Traffic surge controllers may independently monitor overload levels 200-210 for each different message type and may independently test conditions therefor. Each type of control message, e.g., $C_0$-$C_5$, may have an independently fluctuating overload level or function 200-210 associated with only that type of control message.

A plurality of conditions 212-270 for discarding control messages may be stored, each of which uniquely corresponds to a unique combination of each of the plurality of types of control messages, e.g., $C_0$-$C_5$, and each of a plurality of network overload levels, e.g., 0 to 4. Thus, the conditions for each overload level, e.g., 0 to 4, may be specific to each message type. For example, if a first type and a second type of control messages, e.g., $C_0$ and $C_1$, happen to have the same overload level, e.g., level 2 (although their overload levels generally vary independently), a different condition 216 and 226, e.g., discard rates of 30% and 12%, may be respectively associated therewith. In one embodiment, different control messages may have different conditions for the same overload levels, for example, to discard the different control messages disproportionate rates. For example, a Service Provider may discard fewer SendRoutingInfo (SRI) messages (e.g., which facilitate call termination for a subscriber) than other control messages since SRI messages support registered subscribers. In general, discard percentages or rates may be set to prevent the overload levels 200-210 from increasing.

In response to receiving a control message of each of the control message types, a processor may retrieve the condition that uniquely corresponds to the same type of the control message and the level of network entity overload most closely matching the retrieved measure of network entity overload traffic for that message type. Based on whether or not the retrieved condition is met (e.g., a random percentage is less than or equal to the condition's associated discard percentage), the processor may proceed to process the control messages of each type, e.g., in sequence, to register the device or, alternatively, may discard the control messages of all the types, e.g., which are correlated to the same device, to not register the device.

In one embodiment, all types of control messages in the registration sequence may meet the condition criteria for even a single new control message of any of the types to be processed (e.g., to avoid wasting resources on a partial registration). In another embodiment, a predetermined percentage or ratio (e.g., 5/6) of the types of control messages may meet the condition criteria for all the types of control messages to be executed to complete registering the device.

FIG. 2 shows six different types of control messages, $C_0$-$C_5$, and five different overload levels (0)-(4), although other numbers of control message types and overload levels may be used. Furthermore, although the overload levels are shown as discrete levels, changing discretely over time, e.g., as a stair-step function, the overload levels may also change continuously as a smooth function over time.

It may be appreciated that although each combination of overload level and control message type are uniquely associated with a condition, the condition itself (e.g., a discard percentage, n %) may be the same for two or more of such combinations and different for two or more of such combinations. That is, the condition for each combination may be set independently and, as such, may have the same or different values for different combinations. In another embodiment, a unique condition (e.g., a different discard percentage) may be associated with at least each overload level for each single control message type, at least each control message type for each single overload level, or for every different combination of overload level and control message type.

Figure 3:
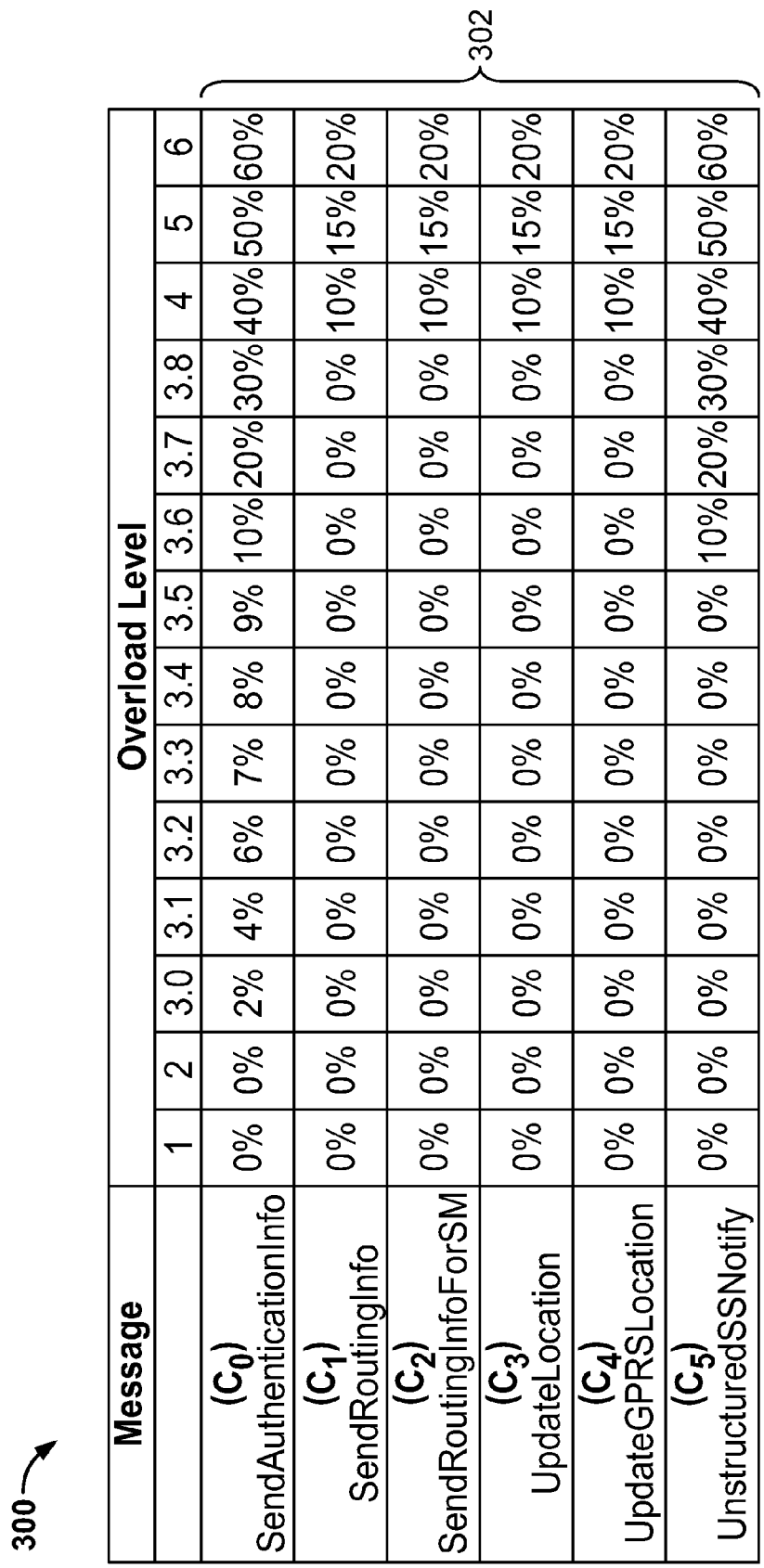
FIG. 3 is a schematic illustration of a data structure defining discard conditions according to embodiments of the invention.

Reference is made to FIG. 3, which schematically illustrates a data structure of a relational database 300 defining discard conditions according to embodiments of the invention.

Relational database 300 may store correspondences between a plurality of types of control messages, $C_i$, i=0, 1, ..., 5, a plurality of overload levels, e.g., (1)-(6), and a plurality of conditions for discarding messages, e.g., discard percentages 0%-60%. Each data field 302 in relational database 300 may define a condition uniquely associated with a different combination of one of the plurality of control message types, e.g., $C_0$-$C_5$, and one of a plurality of predetermined network overload levels, e.g., 1 to 6.

When traffic surge controllers 122, 124 identify that the current network 100 overload most closely matches a specific one of the predetermined network overload levels, e.g., 1 to 6, traffic surge controllers 122, 124 may retrieve the plurality of conditions (e.g., the column) associated with the overload level to test each condition (e.g., in each row of the column) for the same message type (e.g., in the same row). If all (or a sufficient number) of the conditions are met, the registration process may proceed to process a new control message of each of the plurality of types. In one embodiment, if only one (or less than a predetermined number) of the retrieved conditions is not satisfied, the registration process for a new device correlated with the sequence of control message types may be cancelled or put on hold, e.g., for a predetermined stall time or until network traffic subsides. In one example, messages that are discarded or denied may automatically time out and may be automatically re-processed to retry registration after processing the already queued messages of the same type.

In one embodiment, the plurality of control messages, $C_i$, i=0, 1, ..., 5, e.g., may be MAP messages, which may be executed in sequence to register a subscriber. In the example shown in FIG. 3, the different types of MAP messages are, SendAuthenticationInfo" ($C_0$), "SendRoutingInfo" ($C_1$), "SendRoutingInfoForSM" ($C_2$), "UpdateLocation" ($C_3$), "UpdateGPRSLocation" ($C_4$), "UnstructuredSSNotify" ($C_5$).

In one example, discarding certain messages for partial registration may lead to more problems during a traffic surge when a full registration process includes multiple message pairs. For example, successfully processing SendAuthenticationInfo (SAT), UpdateLocation (UL), and InsertSubscriberData (ISD) may be used to successfully communicate through multiple network entities (e.g., HLR, STP, MSC/SGSN) for a subscriber to successfully register. For authentication (SAT), if 5 triplet vectors are used, a minimum of 4 messages may be exchanged for SAI processing. The UpdateLocation process may exchange 6 messages, if 2 ISDs are used. Accordingly, a minimum of 10 messages may be exchanged and processed without being discarded at any entity in the path within a predefined (e.g., 20-second) time interval known as a timer in the handset. If any of the messages are interrupted or discarded, the registration process may be ineffective and re-started.

The plurality of control messages, $C_i$, i=0, 1, ..., 5, may be processed in a predetermined order, e.g., message $C_i$ may be executed before message $C_{i+1}$. In the example in FIG. 3, SendAuthenticationInfo ($C_0$) may be executed before UpdateLocation ($C_3$) and UpdateGPRSLocation operations ($C_4$). In some embodiments, network 100 may initiate subsequent messages only after previously ordered messages successfully complete. Accordingly, traffic surge controllers 122, 124 may first test the condition associated with the first message type in the sequence, e.g., SendAuthenticationInfo ($C_0$). If the discard condition is met, traffic surge controllers 122, 124 may automatically discard subsequent messages, e.g., UpdateLocation or UpdateGPRSLocation, without retrieving or testing their respective conditions. Discarding these messages may free processing space to process new SendAuthenticationInfo messages for a new registration, instead of wasting time executing UpdateLocation or the UpdateGPRSLocation messages for a device that will not ultimately be registered. However, if the discard condition is not met and the first message successfully completes, traffic surge controllers 122, 124 may proceed to retrieve and test the condition for the next subsequent message(s).

In one embodiment, the correspondence between message types, overload levels, and discard conditions may be one-to-one. In another embodiment, some levels may correspond to the same condition(s) (e.g., levels 1 and 2 in FIG. 3), but at least two of the levels correspond to different conditions. In one example shown in FIG. 3, for the control message "SendAuthenticationInfo," two levels, 1 and 2, have the same discard percentage (0%) and the remaining 12 levels 3.0 to 6 have different discard percentages (2%)-(60%). In another example shown in FIG. 3, for the control message "UnstructuredSSNotify," eight levels (1 to 3.5) have the same discard percentage (0%) and the remaining six levels (3.6)-(6) have different discard percentages (10% to 60%). A total of 14 different levels 1 to 6 and 14 different discard percentages (0% to 60%) are shown in FIG. 3 although other numbers of levels and percentages may be used.

Figure 4:
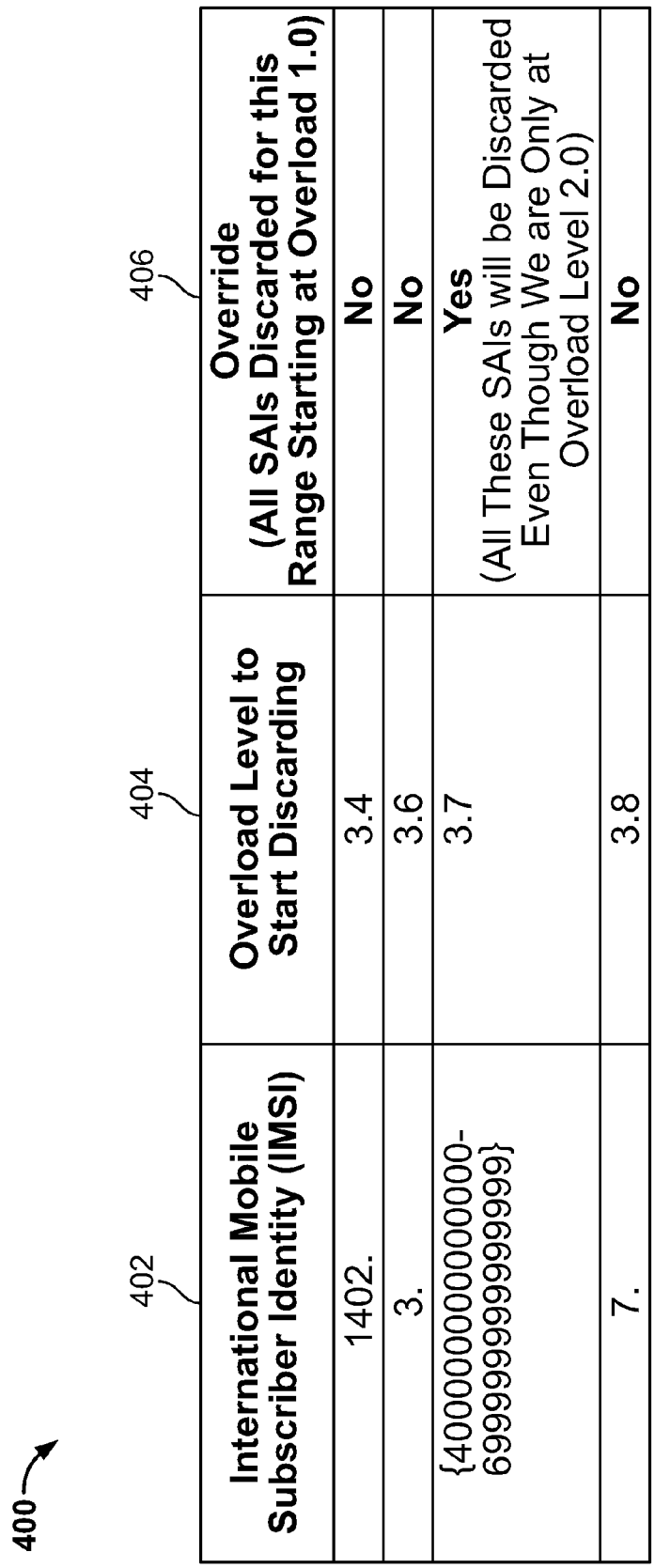
FIG. 4 is a schematic illustration of a data structure of a traffic surge override database defining override settings for traffic surge control according to embodiments of the invention.

Reference is made to FIG. 4, which schematically illustrates a data structure of a traffic surge override database 400 defining override settings for traffic surge control according to embodiments of the invention.

As an alternative to the message-specific conditions of relational database 300 of FIG. 3, a different set of, e.g., subscriber-specific, conditions may be provided in override database 400 of FIG. 4, for example, for selectively discarding messages based on the identity of a subscriber or registering device. Traffic surge controllers may use the subscriber-specific conditions of override database 400 to handle overload independently for different subscribers, e.g., based on the subscribing device's overload history. For example, certain subscribing devices such as smart phones, which are known to create additional network traffic, may be set at higher discard rate in override database 400 than in relational database 300. A system-level flag may control which database 300 or 400 is used for processing each message. For example, registration authentication controllers 116, 118 or sub-system 108 of FIG. 1) may store a flag or an attribute field to direct logic to the proper database 300 or 400.

Registration Authentication Controllers 116, 118 may identify a predefined set of subscriber identities for bypassing or overriding the message-specific conditions of relational database 300 to use the subscriber-specific conditions of override database 400. Override database 400 may store the predefined set of subscriber identities (e.g., as International Mobile Subscriber Identity (IMSI) values) in data fields 402 (e.g., column (1)).

Override database 400 may include an array of different discard rates (e.g., as in relational database 300) or simply a single absolute cutoff overload level (e.g., data fields 404) above which all messages are discarded for each corresponding subscriber identity. In one example, each identified subscribing device may have a uniquely corresponding cutoff overload level, e.g., levels 3.4, 3.6, 3.7, and 3.8 shown in FIG. 4. In another example, override database 400 may define a single cutoff overload level (e.g., the first non-zero overload level 1) for all identified subscribing devices.

Override database 400 may include data field(s) 406 indicating if an override mechanism is active or non-active, e.g., if the current overload exceeds the cutoff overload level. For example, when the override mechanism is active (exceeds the first non-zero overload level) for each subscriber in data field 402, the override mechanism may ignore the overload level rules (e.g., of relational database 300) for that subscriber and may discard all (or a predetermined percentage of) messages of a specific type, e.g., SAIs.

Registration authentication controllers 116, 118 may also use override database 400 to selectively discard a percentage of messages based on IMSI ranges or equipment types. Thus, an operator may reduce or eliminate the processing resources allocated to a predefined set of devices (e.g. an improperly acting handset) and allow other devices to remain unaffected by the overload processing.

Registration authentication controllers 116, 118 may also override system settings based on the overload level. Certain system settings may be independently adjusted to change at a user-specified overload level. For example, retry values defining the time delay for retrying previously discarded control messages may be set to different (e.g., smaller) values than the standard retry values used for messages of the same type. When the overload level subsides to less than the override threshold, the system settings may be automatically restored to their pre-overload settings.

Override database 400 may enable a user or service provider to customize the override modes by providing system settings such as retry values, one or more devices, IMSI values or ranges, discard percentages or absolute cutoff overload levels or any data in data fields 402-406. In one example, the service provider may configure non-overload levels to emulate overload level when an application is not in a "real" overload situation.

Multiple override and/or relational database(s) may be used together, e.g., in sequence, to selectively discard messages based on a plurality of conditions from a plurality of tables. For example, a first table may store a correspondence between subscriber identifiers (e.g., IMSI ranges) and other tables (e.g., databases 300 and 400) that the subscriber may access to validate messages. For example, a first table may validate conditions from a first and second table, a second subscriber may only validate conditions from the first table, and a third subscriber may validate conditions from the second and a third table.

Other conditions or override thresholds may be used. Registration authentication controllers 116, 118 may store databases 300 and 400. Each override database 400 may define conditions for a specific type of message, for example, SAIs. A separate override database 400 may be used for each (or at least two) of the plurality of control messages types (e.g., $C_0$-$C_5$) for registering a device. Alternatively, a single database may be used to list override conditions for a plurality of message types and for a plurality of subscribers.

Figure 5:
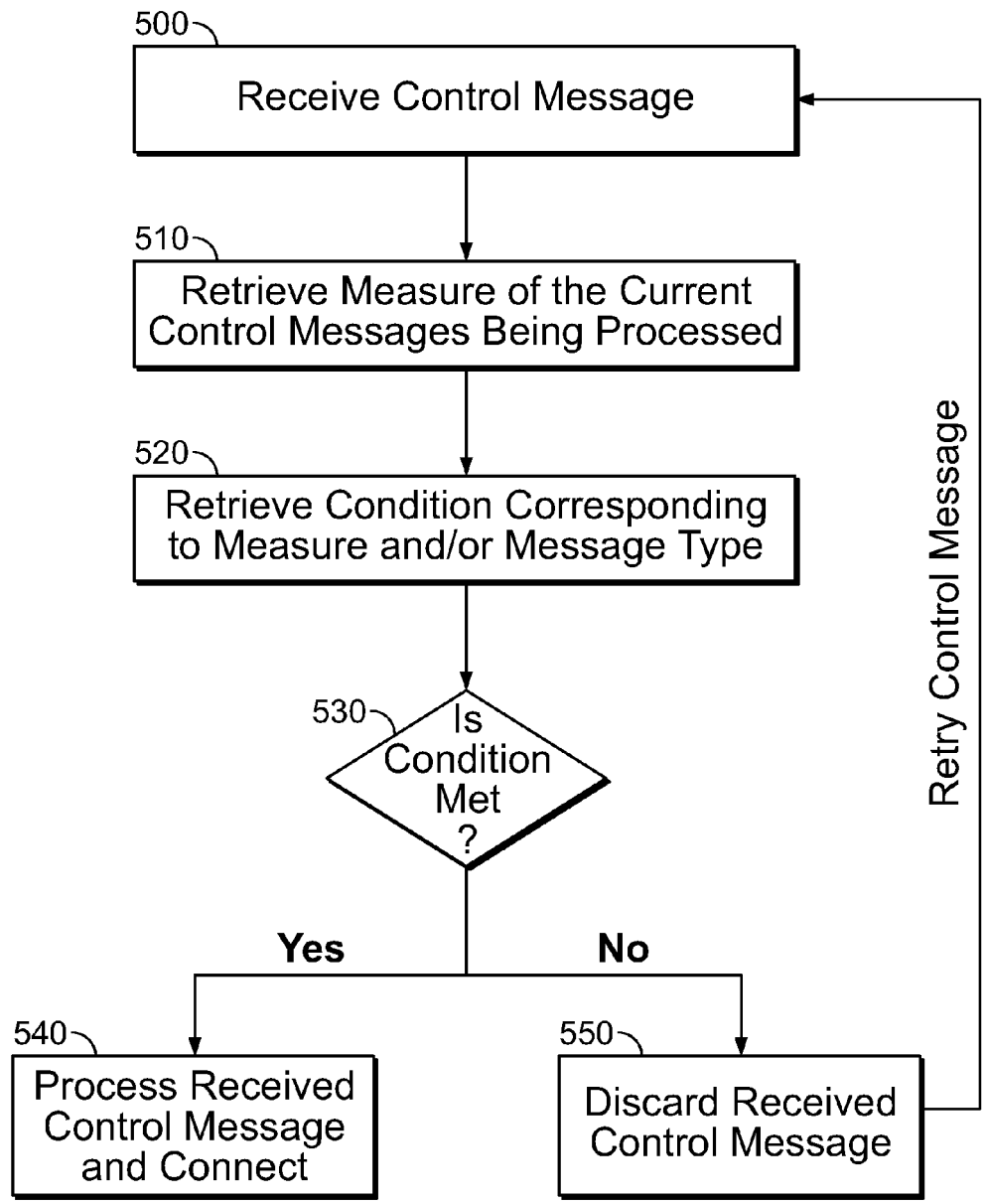
FIG. 5 is a flowchart of a method according to embodiments of the invention.

Reference is made to FIG. 5, which is a flowchart of a method according to an embodiment of the invention.

In operation 500, a processor (e.g., registration authentication controllers 116, 118 of FIG. 1) in a system (e.g., network 100 of FIG. 1) may receive a control message from a device (e.g., mobile station 102 of FIG. 1) requesting to register in the system.

In operation 510, the processor may monitor system traffic levels. The processor may retrieve a measure of the current control messages of the same type already being processed in the system, for example, measured by a system API. The control message received in operation 500 may automatically trigger the processor to retrieve the measure of the current control messages in operation 510.

In operation 520, the processor may retrieve a condition corresponding to the retrieved measure from among a plurality of conditions, each defining different rules for discarding the control message and corresponding to one of a plurality of measures of current control messages. When a plurality of messages are used to register the device, each message type may have a unique set of conditions corresponding to the plurality of overload levels. Accordingly, the processor may retrieve the condition uniquely corresponding to the retrieved measure and message type.

In operation 530, the processor may determine whether or not a condition is met. If the condition is met, a process may proceed to operation 540. If the condition is not met, a process may proceed to operation 550.

In operation 540, a connector may process the received control message (e.g., alone or in a sequence of registration control messages) to connect the device after completing registration (e.g., the condition of operation 530 and/or other operations in the registration sequence is/are met) with another device already registered in the network. A connector may include MSC 110, 120 of FIG. 1, a VLR/MSC (for connecting the device after registering with an HLR), a Serving Call Server Control Function (S-CSCF) (for connecting the device after registering with an HSS in an IMS domain), a Mobility Management Entity (MME) (for connecting the device after registering in an EPS domain), and/or an Authentication, Authorization, and Accounting (AAA) (for connecting the device after registering in a WLAN domain).

In operation 550, the processor may discard or deny the received control message. The registration process for the device correlated with the received control message may be cancelled or put on hold, e.g., for a predetermined stall time or until system traffic subsides. In one example, the received control message may automatically time out and may be automatically re-entered or received in the registration queue.

Other operations or orders of operations may be used.

In an embodiment, a control message may be received for registering a new device in a system or network. A measure of a number of current control messages already being processed in the network may be retrieved. A plurality of conditions may be provided, in which each condition may define different rules for discarding the new control message for registering the new devices and each condition may correspond to one of the plurality of measures of current control messages. A condition may be retrieved from among the plurality of conditions, which corresponds to the retrieved measure of current control messages. It may be determined whether or not the retrieved condition is met. Based on the determination, the new control message may be processed to register the new device or discarded, e.g., to not register the new device.

In an embodiment, for example, for controlling traffic surges in a network, a predetermined correspondence may be stored between a plurality of levels of network traffic flow and a plurality of rates of discarding new messages. When a new message is received and, for example, a traffic surge is detected, the rate of discarding may be automatically retrieved that corresponds to one of the plurality of levels of network traffic flow currently identified in the network. New messages, for example, for initiating a new registration, may be discarded at approximately the retrieved discarding rate. In some embodiments, messages for continuing an already initiated registration may be processed, for example, to complete registering the device.

In an embodiment, a new control message may be received for registering a new device in a network. A measure of network entity overload may be retrieved of the current control messages, e.g., of the same type, already being processed in the network. A plurality of predefined levels of network overload may be stored, wherein each predefined level uniquely may correspond to one of a plurality of conditions for discarding the control message. The condition that corresponds to the predefined overload level that most closely matches the measured overload may be tested. Based on whether or not the condition is met, the new control message may be processed or discarded.

Some embodiments may be implemented as software, e.g., executable by processor(s) in a network (SCP) environment, or as hardware devices. Although controllers (e.g., traffic surge controllers 122, 124 of FIG. 1) are described that selectively discard control messages for registering devices, controllers may be used to selectively discard other types of messages, e.g., data messages (e.g., calls, texts, voice messages, webpage data, SMS, MMS, etc.). Accordingly, the controllers may manage traffic of control messages in a signaling network (e.g., an SS7 network) and data messages, such as texts, emails, or web pages, in a telephone or data network, e.g., separately, or in combination. Network 100 may manage data retrieval from any database or messaging server, e.g., including HLRs, VLRs, HSSs, SLFs, SGSNs, or MSCs.

A type of message may indicate the form of the message, in general, not the specific instance of the message. A type of message may be a specific computer-readable code or identifier, e.g., "SendAuthenticationInfo", correlated with a specific processor action, e.g., send authentication information, not each instance of the message type, which may be correlated with the same processor action but implemented for a specific device. Thus, a type of message may include all instances, e.g., hundreds, of messages of that type executing a single registration step for, e.g., hundreds, of different respective devices. Different instances of a message of the same type may be indistinguishable to a processor, causing the processor to act in the same manner for each instance. For example, each of messages "SendAuthenticationInfo", "SendRoutingInfo", "SendRoutingInfoForSM", "UpdateLocation", "UpdateGPRSLocation", "UnstructuredSSNotify" may be considered an individual message type.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A method comprising:
receiving a control message for registering a device in a network;
retrieving a measure of current control messages of a same type being processed in the network from a counter, wherein said counter measures at least one of a specific measurement and a relative measurement of said current control messages;
retrieving a unique condition, from among a plurality of unique conditions, that corresponds to the retrieved measure of current control messages, each retrieved unique condition defining a different rule for discarding a control message of the same type and corresponding to one of the measures of current control messages; and
processing the received control message to register the device or discarding the received control message based on a satisfied retrieved unique condition and an overload message percentage, wherein the satisfied retrieved unique condition is determined by satisfaction of the different rule.

2. The method of claim 1, wherein the plurality of unique conditions define a plurality of percentages of control messages to be discarded, wherein the retrieved unique condition is satisfied when a randomly generated percentage is less than or equal to the percentage of received control messages to be discarded.

3. The method of claim 2, wherein each of the plurality of percentages is proportional to the measure of the current control messages already being processed in the network.

4. The method of claim 2, wherein each of the plurality of discard percentages is applied to a different level of network overload to limit a total accumulated number of control messages to be simultaneously processed to be less than a predetermined measure defining a threshold for network overload.

5. The method of claim 1, wherein the plurality of unique conditions are stored in a look-up table where each unique condition uniquely corresponds to each unique corresponding measure of a number or range of current control messages.

6. The method of claim 1, wherein the unique condition limits a total accumulated number of control messages being simultaneously processed by discarding control messages for registering devices that have not yet begun the registration process.

7. The method of claim 1, wherein said specific measurement includes at least a selection from among a value, a rate, a frequency or a volume, and said relative measurement includes at least a selection from among a traffic flow rank, level, order or score.

8. A method to control network overload, the method comprising:
- receiving a plurality of control messages of a plurality of different types and of the same priority, which when executed together in sequence registers a device in the network;
- receiving an indication of a current network overload independently associated with processing control messages of each of the plurality of different types and of the same priority separately from a counter;
- storing a condition for discarding control messages uniquely corresponding to each combination of each of the plurality of types of control message and each of a plurality of network overload levels;
- retrieving the condition for discarding control messages that uniquely corresponds to the type of the control message and the level of network overload that most closely matches the retrieved indication of network overload for that message type; and
- processing the control message to register the device or discard the control message based on a satisfied retrieved condition and the level of network overload, wherein the satisfied retrieved condition is determined by satisfaction of a rule.

9. The method of claim 8, wherein each condition defines a rate or percentage of discarding received control messages of a particular type.

10. The method of claim 8, wherein discarding received control messages limits a total accumulated number of control messages being simultaneously processed to be below a predetermined level associated with network overload.

11. The method of claim 8, comprising a plurality of counters, where each counter provides a measure of each type of control message separately.

12. A system comprising:
- a network device;
- a processor operably connected to said network device and configured to receive a control message from said network device requesting to register in the system, for retrieving a measure of current control messages of the same type already being processed in the system from a counter, wherein said counter measures at least one of a specific measurement and a relative measurement of said current control messages, and,
- retrieving a condition from among a plurality of conditions that corresponds to the retrieved measure of current control messages, each condition defining different rules for discarding a control message of the same type and corresponding to one of a plurality of measures of current control messages; and
- a connector device operably connected to said processor, which processes the received control message to register said network device or discards the received control message based on a satisfied retrieved condition and an overload message percentage, wherein the satisfied retrieved unique condition is determined by satisfaction of the different rule.

13. The system of claim 12, wherein the connector registers the device using subscriber information stored in a home location register.

14. The system of claim 12, comprising the processor retrieves the measure of the current control messages from an application programming interface.

15. The system of claim 12, comprising a memory configured to store the correspondences between the plurality of conditions and the plurality of measures of current control messages, and to store measurements of said counter.

16. The system of claim 12, comprising a relational database for storing the correspondences between the plurality of conditions and the plurality of measures of current control messages.

17. The system of claim 16, comprising an override database for storing one or more alternative conditions corresponding to the plurality of measures of current control messages.

18. The system of claim 17, wherein the processor is configured to receive user-customized alternative conditions.

19. The System of claim 12, wherein said specific measurement includes at least a selection from among a value, a rate, a frequency or a volume, and said relative measurement includes at least a selection from among a traffic flow rank, level, order or score.

20. The system of claim 12, wherein said counter measures at least one of an overall network traffic flow, a number of current control messages queued to be processed or a control message overload.

* * * * *